Aug. 25, 1925.

F. C. CAMPAÑA 1,551,008

CURRENT ACCOUNT CALCULATING MACHINE

Filed March 1, 1921    6 Sheets-Sheet 1

Fig. 1.

INVENTOR
Francisco Campos Campaña
BY
ATTORNEYS

Aug. 25, 1925.

F. C. CAMPAÑA 1,551,008

CURRENT ACCOUNT CALCULATING MACHINE

Filed March 1, 1921     6 Sheets-Sheet 2

INVENTOR

BY

ATTORNEYS

Aug. 25, 1925.

F. C. CAMPAÑA 1,551,008

CURRENT ACCOUNT CALCULATING MACHINE

Filed March 1, 1921     6 Sheets-Sheet 3

*Fig. 4.*

INVENTOR

BY

ATTORNEYS

Aug. 25, 1925.

F. C. CAMPAÑA 1,551,008

CURRENT ACCOUNT CALCULATING MACHINE

Filed March 7, 1921 6 Sheets-Sheet 4

INVENTOR
Francisco Campos Campaña
BY
Pennie, Davis, Marvin & Edmonds
ATTORNEYS

Aug. 25, 1925. 1,551,008
F. C. CAMPAÑA
CURRENT ACCOUNT CALCULATING MACHINE
Filed March 1, 1921 6 Sheets-Sheet 5

Fig. 7

INVENTOR
BY
ATTORNEYS

Aug. 25, 1925.

F. C. CAMPAÑA 1,551,008

CURRENT ACCOUNT CALCULATING MACHINE

Filed March 1, 1921 6 Sheets-Sheet 6

INVENTOR

BY

ATTORNEYS

Patented Aug. 25, 1925.

1,551,008

UNITED STATES PATENT OFFICE.

FRANCISCO CAMPOS CAMPAÑA, OF MADRID, SPAIN.

CURRENT-ACCOUNT-CALCULATING MACHINE.

Application filed March 1, 1921. Serial No. 448,898.

*To all whom it may concern:*

Be it known that I, FRANCISCO CAMPOS CAMPAÑA, a bank manager, and a subject of the King of Spain, residing at Lealtad, No. 6, Madrid, Spain, have invented certain new and useful Improvements in Current-Account-Calculating Machines, of which the following is a specification.

The current account calculating machine forming the subject of this invention has the object of calculating the balance for each separate client of a business and of retaining the result in a separate section for each client. The interest numbers required for the direct calculation of the interest and the various balances can also be ascertained in a simple manner by means of the machine.

In the machine a set of elements is provided for each customer, which is adapted to be set independently and to be brought into engagement with driving and transmitting members. Each set of these elements comprises a number of racks disposed one behind the other in one plane, the first of which corresponds to the units, the second to the tens, the third to the hundreds and so on. The separate sets of elements are mounted next to each other, so that the racks for the units, tens, hundreds and so on lie in one row parallel to each other. In front of each series of racks representing the units, tens and so on, there is a long pinion with ten teeth, which extends over the entire width of the machine and is connected by bevel gears to a gear having ten teeth. The latter can be brought into engagement with a pivotally mounted addition gear, which can be turned, according to the number to be added or subtracted, by a corresponding number of teeth, the amount through which it is turned being capable of being transmitted to the racks. In this manner the separate racks of a set are set to different heights the balance being obtained from the different height of the separate racks.

The interest numbers are ascertained by causing a set of gears having ten teeth to engage with the stationary racks and to roll on the same, each gear being turned through the greater or smaller number of teeth according to the position of the rack.

A constructional example of such a calculating matchine is shown in Figure 1 in side elevation, partly in section.

Figs. 9, 10, 11 and 12 show the transfer mechanism of the adding mechanism.

While the calculating machine shown in the drawing is intended for only ten accounts, it is of course possible to construct it for a far greater number of accounts.

Figure 4:
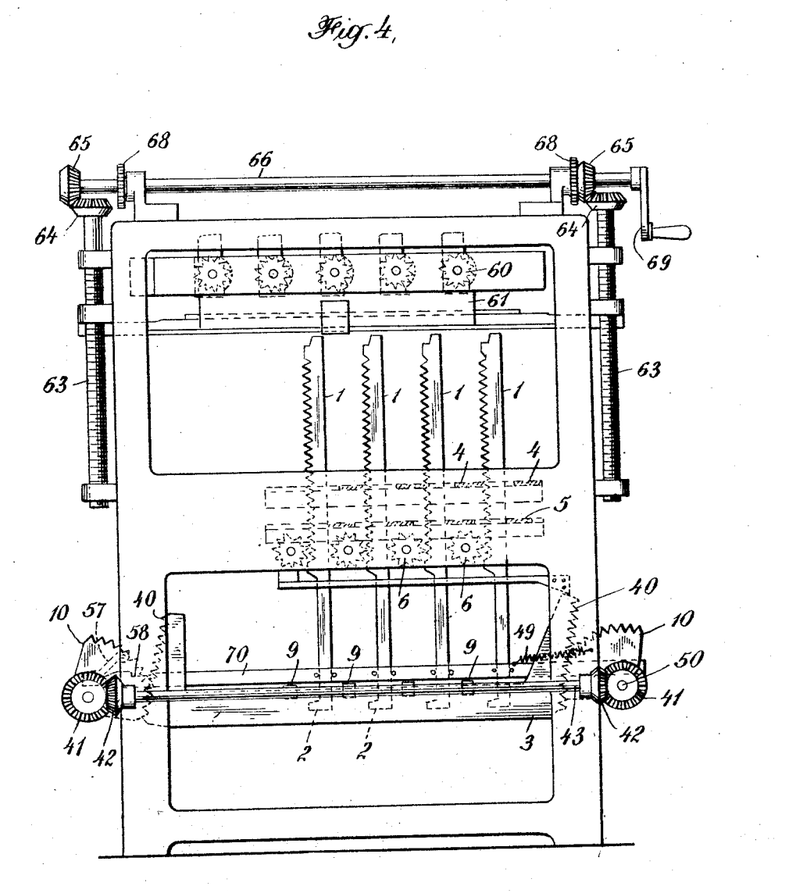
Fig. 4 shows the arrangement of the racks in side elevation, the adding mechanism being omitted.
Figure 5:
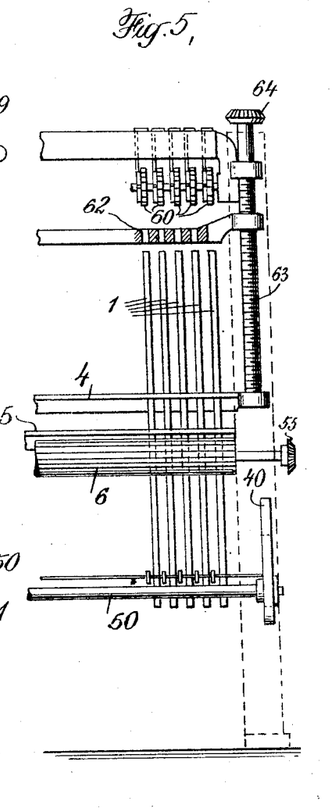
Fig. 5 shows a detail of the interest calculating mechanism.

For each account a set of racks 1 is provided, which are arranged one behind the other in one plane and four of which are shown in the constructional example in Figure 4. The first rack from the right is intended for the units, the second for the tens, the third for the hundreds, the fourth for the thousands and so on. Each rack can be moved up and down ten teeth. The lowest position corresponds to zero and the highest to 9. Each rack passes through two bars 4 and 5 (Figs. 4 and 6), which are provided with openings, which are somewhat longer than the width of the racks. The mode of operation of the machine is of course in no way altered by this small constructional modification. When the racks are in the vertical position (Fig. 5) their teeth engage in the front edges of the openings in the upper bar 4, while the smooth rear surfaces of the racks rest against the back edges of the openings of the lower bar 5. The smooth lower ends of the racks are each guided between two stops in a sliding member 70, so that, on the sliding member 70 being displaced, the lower ends of all the racks of one set must take part in the movement, but so that they are free to move up and down. The sliding members 70 are normally held by springs 49 in the position shown in Figs. 4 and 5, in which the racks are vertical.

Figure 3:
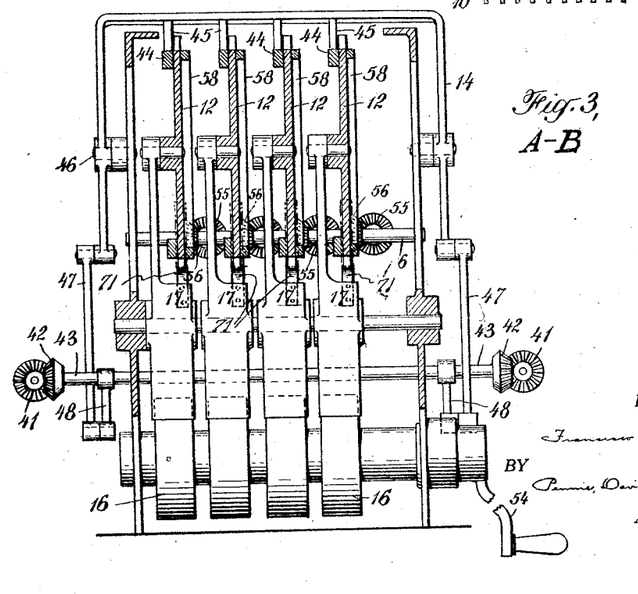
Fig. 3 is a vertical section along the line A—B of Figure 1.

In front of each series of racks 1 there is a long pinion 6, which extends right across the machine and is provided at one end with a bevel pinion 55, Fig. 3. On the sliding member 70 being pushed forward, the racks 1 connected with it are set obliquely so that they are caused to engage, as shown in Fig.

Figure 6:
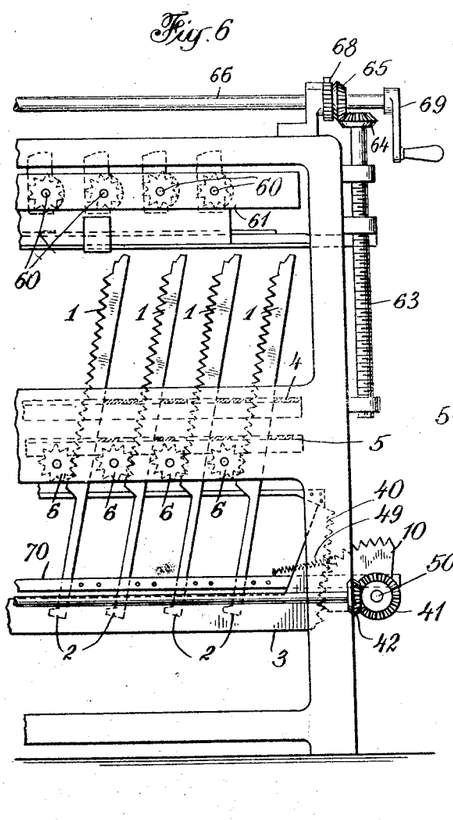
Fig. 6 shows a side elevation of the racks in engagement with the long pinions.

6, with the long pinions 6, their upper ends being disengaged from the locking bar 4. When the sliding member is pushed forward, it is kept in its forward position by a pivoted locking member 57 (Fig. 4), which extends right across the machine, engaging in a recess 58 of the sliding member 70. On another sliding member 70 being pushed forward after the calculation has been completed, the said sliding member first raises the pivoted member 57, so that the sliding member 70 previously pushed forward is released and is drawn back by its spring 49 into the initial position. The effect of this arrangement is that only one set of racks 1 can at any time be in engagement with the long pinion 6.

In order that the racks 1 may be brought into the zero position, i. e., into their lowest position, a frame 3 is provided, which is fitted with a cross-bar 9 for each series of racks 1. At the lower end of each rack there is a projecting part 2, which engages under the cross-bar 9, when the racks are in their oblique position. The frame 3 is provided at both ends with inclined racks 40 (Fig. 4), in which toothed segments 10 of a suitable shape engage, which are fixed on shafts 50. Each of these shafts is provided with a bevel pinion 41, which meshes with a bevel pinion 42 fixed on a shaft 43. This insures a simultaneous and uniform motion of the toothed segments 10 and consequently an accurate displacement of the frame 3. According to the position of the racks 1 they are carried along by the downward movement of the frame 3 sooner or later, the long pinions 6 being turned through a corresponding number of teeth.

Next to the various sets of gears and at right angles to the same a so-called adding mechanism is provided for each long pinion 6, which mechanism consists substantially of a wheel 12 provided with 40 teeth, which can be brought into engagement either with a toothed wheel 11, which has 10 teeth and is connected by the bevel pinions 55 and 56 with the long pinion 6 or with a gear 19 having 20 teeth. For this purpose the gear 12 is mounted at the upper end of a lever 17, which is rotatable about the shaft 52 and the lower arm of which rests against a cam 16 fixed on the shaft 53. A spring 51 keeps the said arm in contact with the cam.

On one side of each gear 12 there is a ring of numerals 58 (Fig. 3), which bear four sets of numerals 0–9 and on the other side there are four teeth 44, which are at 90° to each other. Similarly the gears 19 are provided on one side with a ring of numerals 59, which bear two sets of numerals 0–9, one set of numerals in one direction being colored red and the other set in the other direction being colored black. These gears are kept in their zero position or brought back into this position by springs 20, when they have been moved out of it.

Figure 1:
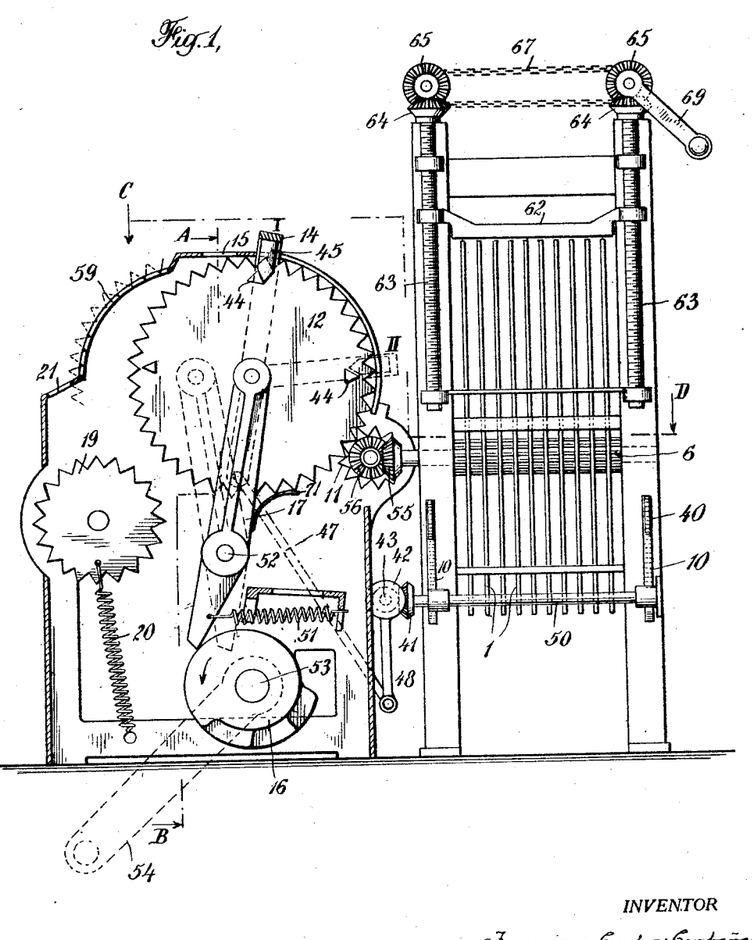
Figure 2:
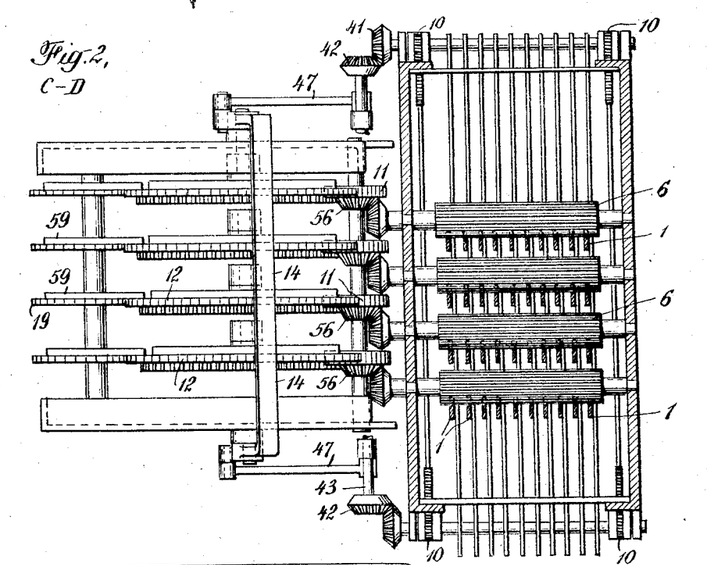
Fig. 2 is a vertical section on the line C—D of Figure 1.

All the gears 12 are spanned by a stirrup 14 (Fig. 3), which is rotatable about the trunnions 46 fixed to the casing of the machine. The lower ends of the stirrup are connected by connecting rods 47 to the arms 48, which are fixed on the shaft 43. On the stirrup 14 being thrown over from the position marked I in Fig. 1 to the right into the position marked II, a rotary motion is imparted to the shaft 43, which is transmitted by means of bevel wheels 42 and 41 to the shafts 50 with the tooth segments 10, so that the frame 3 with the cross-bars 9 is pushed downwards, whereby those racks, which have been put in an oblique position by the sliding member 70 and been brought into engagement with the long pinions 6, are carried along according to their position as regards height by a smaller or greater number of teeth. The stirrup 14 is provided in the plane of each set of teeth 44 with a downwardly projecting tooth 45, which teeth are adapted to engage with the teeth 44. The rotary motion of the stirrup 14 is limited by stops in such a manner that the stirrup does not move the geared dial 12 out of its position when the latter is in its zero position, as shown in Fig. 1. The tooth 45 of the stirrup, when the latter is in the position I, will just touch the upper tooth 44 of the gear 12 and, on the stirrup being thrown over to the right in the position II, will just come in contact with the tooth on the right hand side of the gear 12, without however moving it.

The casing, which encloses the gears 12 along with their accessories, is provided with two windows, 15 and 21, through which the rings of numerals on the gears 12 and 19 may be observed and with slots 59 through which, when the gears 12 are in their left hand position, nine teeth of the same will project. When all the wheels are in the zero position the values 0000. . . . will also be visible in the windows.

The transfer mechanism or carrying over of units to the tens and so forth may be of any suitable design.

For calculating the interest the arrangement is as follows:—Above the racks 1 the plate 62 is mounted, which is provided with openings for the racks 1 to pass through and is held at its four corners by vertical screw spindles. By turning these screw spindles in one direction or the other, the plate 62 can be raised or lowered. On the upper end of the screw spindle 63, bevel gears 64 are mounted, which mesh with bevel gears 65 on the horizontal shafts 66. On the two shafts 66, one of which is provided with a crank 69, sprocket 68 are mounted, which are connected together by a chain 67. On the crank 69 being turned, owing to this arrangement all four spindles 63 will be turned simultaneously and uniformly in the same direction. On the plate 62 there is a frame 61, on which the gear 60 is mounted for each rack 1, each of the gears 60 being provided with a lateral ring of numerals. The frame 61 is adapted to be displaced in the direction of the racks, which lie one behind the other, but is normally in such a position that the gears 60 do not mesh with the racks during the downward movement of the plate 62. The distance travelled by the plate 62, which is limited by suitable stops, is such that the axes of the gears 60 in their lowest position lie 9½ divisions below the centre line of the highest tooth of the rack which is set to the numeral 9. If the frame 61 be then displaced so far to the right (Fig. 4), that the gears 60 mesh with the racks and if the plate 62 with the frame and the gears be then raised again by reversing the motion of the screw spindles 63, the gear 60 will be turned by a number of teeth, which is greater the higher the particular racks are set. The gear 60, which co-acts with a rack that is in its lowest position will not be turned at all, while a gear, which is brought into engagement with a rack that is set to 9, that is occupies its highest position, will be turned by nine teeth. Thus, the numeral discs mounted on the gears 60, after the upward movement is completed, will indicate the amount of the balances of all the accounts of the machine. If this upward and downward movement of the plate 62 and of the frame with the gears 60 be repeated, the product will be obtained:—2 x balance, 3 x balance and so on.

If this work be carried out at the end of each business date of a current account department, a product will be obtained by the repeated adding up of the balances for each account, viz:—

Capital x number of days, which has passed since the first capital was paid in.

The interest of a capital for a given period is obtained from the formula:—

$$\frac{\text{Capital x number of days x rate of interest}}{365 \times 100}$$

The value $$\frac{\text{rate of interest}}{36500}$$

is a constant and since the value: capital x number of days is automatically calculated by the machine it will only be necessary to multiply this interest number with the constant factor, which is simplified by the use of tables, on balancing an account, which is usually done every three or six months for ascertaining the amount of interest required. When the rate of interest, that is, the constant factor is changed, the interest is calculated up to the day of the change of rate of interest, the wheels are set to zero and the new interest number required for calculation is formed by daily addition.

The following example will serve to explain the operation of the machine:

| | | |
|---|---|---|
| Let an account x have a balance of | Mark | 8753 |
| This amount is to be increased by so that the new balance amounts | " | 148 |
| to | " | 8901 |
| This amount is to be reduced by | " | 2305 |
| So that there is finally a balance of | " | 6596 |

Figure 7:
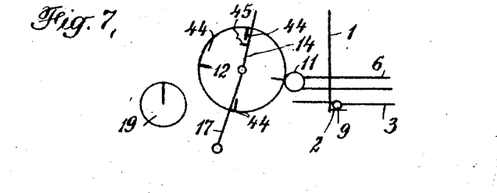
Figs. 7 and 8 are diagrams showing how the machine works.
Figure 8:
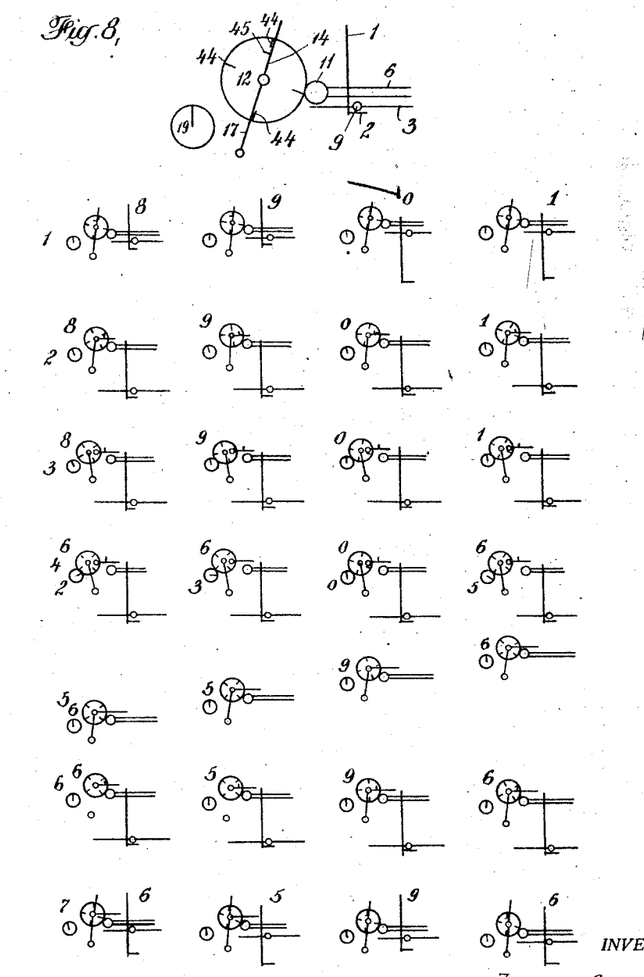

The operation is to be carried out as shown clearly in Figs. 7 and 8, each of which indicates the different positions.

In order that the various reference numbers need not be repeated for each position of the various parts, a diagram is given at the beginning of each of Figs. 7 and 8, which shows all the reference numbers, so that in the other parts of each figure it will be readily seen which parts are referred to.

I. The four racks belonging to the account X are at different heights corresponding to the numbers 8, 7, 5, 3. The sliding member 51 of the account X is pushed in so that the four racks 1 will mesh with the long pinions 6, as shown in Fig. 6.

At this moment the principal parts of the machine are in the positions shown in the first row of Fig. 7. The gears 12 are in engagement with the wheels 11 in the zero position. The gears 19 are out of engagement, but are held in the zero position by the spring 20. The teeth 45 of the stirrup 14, which is in the position I are in contact with one of the four teeth 44 of each of the gears 12 and the frame 3 with the cross-bars 9 is in its raised position.

II. The stirrup 14 is placed in the position II. (See row 2). At the same time the movement of the stirrup is transmitted by means of the lever of the gears 47, 48, 42, 41, 10 and 40 to the frame 3 with the cross-bars 9, so that the frame 3 with the cross-bars 9 will occupy its lowest position. The cross-bars 9, which engage behind the projections 2 of the racks 1, draw the racks down until they reach their zero position. As, however, these racks are in engagement with the long pinions 6 they will turn the latter by an amount corresponding to as many divisions as correspond to the downward movement of the racks 1. Consequently, the gears 12, which are in engagement with the long pinions 6 by means of the bevel gears 55 and 56, will also rotate about their axes by as many teeth as the downward movement of each rack 1 amounted to. In accordance with these movements the gear 12, which represents the units, will move forward by three teeth, the gear 12 corresponding to the tens by five teeth, the gear corresponding to the hundreds by seven teeth and the gear corresponding to the thousands by eight teeth.

All the operations in the machine referred to under II were affected by throwing over the lever 14 from its position I into its position II (see Fig. 1). The various parts of the machine now occupy the position shown in row 2 of Fig. 7 and the number

8753 that is, the balance of the account X, may also be read through the top opening 15 (Fig. 1) of the casing of the registering apparatus from the numeral discs 58 of the wheels 12. The gears 12 are held in this position by spring 71 and cannot turn by one tooth more or less owing to gravity or for any other reason, as long as the various parts of the machine are not broken.

While in the position just described (row 1 Fig. 7) the teeth 45 of the stirrup 14 were always in contact with one of the four teeth 44 of each gear 12, in the second position (row 2 Fig. 7) the teeth 45 have moved away from the teeth 44 by the following distances:—

In the case of the units gear 12 by six divisions, the tens gear 12 by four divisions, the hundreds gear 12 by two divisions and the thousands wheel 12 by one division.

The movements in the machine always take place in the manner described in paragraphs I and II, when the amount of the balance of any client is to be ascertained. Thus, it is only necessary to push the sliding member 5 and to turn the lever 14 down to about a right angle, which movements can be effected in less than a second.

III. If the balance of the account X, which is assumed to be 8753, is not only to be ascertained, but to be increased by any amount, say 148, after throwing over the stirrup 14 into the position II, the crank 54 (Fig. 1) must be given a turn.

By the crank 54 the eccentrics 16 are turned, whereby the levers 17 are released, so that the gears 12 are removed from the gears 11 and enter into engagement with the gears 19. Since the movements of the levers 17 take place successively, the pressure on the shaft 53 will not take place all at once so that the movement of the crank 54 is a uniform and smooth one.

The gears 12 are prevented from turning about their own axes at the moment, in which they are not in engagement with a second gear, by the arrangements for carrying over the tens. Consequently, the gears 12, on meshing with the gears 19, will retain the position into which they were forced by the corresponding racks 1, when the units gear 12 was turned through three divisions, the tens wheel 12 through five, the hundreds wheel 12 through seven and the thousands gear 12 through eight divisions.

The main parts of the machine will now occupy the positions shown in the third row of Fig. 7. It will be seen that the axis of rotation of the gears 12 no longer coincides with the axis of rotation of the stirrup 14. The gears 12 are therefore capable of rotating about their axes, without any of their four teeth 44 striking the teeth 45 of the stirrup 14.

From the window 15 of the casing the balance number has disappeared together with the gears 12. It should be observed that the gears 12, which now mesh with the gears 19, occupy the positions corresponding to the value 8, 7, 5 and 3, while the wheels 19 are all at zero, so that the value 0000 will appear in the window 21.

IV. On throwing over the crank 54, the teeth of the gears 12 will appear at the surface of the casing through the slots 59 (Fig. 1), while their numeral discs 58 remain hidden under the casing.

Either by means of the teeth of the gears 12 or by means of some interposed mechanism, the gears 12 will be rotated in the clock-wise direction by as many teeth on each gear as the number of digits to be added to the particular column. The gears 19 will then indicate in the window 21 of the casing in black numbers by what amount the gears 12 have been turned.

In the example given above the procedure will be as follows:—The units gear 12, which has already been moved through three divisions from its zero position, will now be turned through eight more divisions, that is, beyond the quadrant into the position I in the next quadrant. As, however, the total amount of the rotation of the gear 12 is more than 90°, in the meantime, during the passage from 9–0, the carrying over of the tens between the units gear and the tens gear 12 has been prepared.

Similarly, the tens gear, which had originally been turned through five divisions by its respective rack 1, is turned through a further four divisions, so that it will occupy the position corresponding to the value 9. The arrangement for carrying over the tens has in this case not yet been put into the position in which it is ready for operation.

The hundreds gear, which was originally turned by its respective rack 1 through seven divisions, is turned through a further division, so that its position corresponds to the value 8, where it will also not operate the arrangement for carrying over the tens.

The gears 12 may be turned successively, in which case the sequence is immaterial, or they may be turned simultaneously by means of a special well known device. The carrying over of the tens in no way disturbs the rotation of the various gears, owing to the special way they are arranged.

After these operations have been carried out, the window 21 in the casing shows the following numbers of the numeral discs of the gears 19:—zero (0) in the thousands column, one (1) in the hundreds column, four (4) in the tens column and eight (8) in the units column, that is, the number 0148, which was to be added, while in the window 15 there will be no numbers.

IV. Fig. 7 shows the disposition of the main parts of the machine after these operations.

If the gears 12 were returned, by turning the crank 54, into their original positions, without the arrangement for carrying over the tens being operated during their returning motion, the actual number 8901 would not appear in the window 15, but the number 8891, as shown in the fourth row of Fig. 7.

V. The crank 54 is turned into its original position, the result of which is as follows:—

The eccentrics 16 come in contact with the levers 17 successively in such a manner that only one lever is operated at a time. This results in the gear 12 being removed from the gears 19 and again meshing with the gears 11. The movement commences with the units gear. During these successive movements of the gears 12 the arrangement for carrying over the tens is operated at each gear. In the present example (see fifth row of Fig. 7) the units gear 12, which was moved through more than 90°, will move the tens gear 12 by one tooth by means of the arrangement for carrying over the tens, so that the tens gear, instead of indicating 9, will indicate 0.

On the crank 54 being turned further the tens gear 12 will commence its movement. As it already stood at 9 and has just been moved by a further tooth by means of the arrangement for carrying over the tens and has thus been moved by ten teeth altogether, that is, exactly through 90°, the arrangement for carrying over the tens will be put in operation in the case of this wheel as well and the hundreds gear will be moved by a tooth, that is, will be turned from 8 to 9.

The hundreds gear 12 will then commence to move, but as its movement does not amount to a quarter of a circle, the arrangement for carrying over the tens will not be operated in the case of this gear.

Finally, the thousands gear 12 will be moved and as this gear has not already been moved in any way, neither previously nor immediately by the hundreds gear, it will remain in the same position with respect to the lever 17. The fifth row in Fig. 7 shows how these successive movements of the gears 12 take place.

VI. On the return movement of the crank 54 into its original position being completed, the principal parts of the machine are in the position shown in the sixth row in Fig. 7, that is, similar to the position shown in the second row of Fig. 7 and described in paragraph II, with the difference that the gears 12 now show the numbers 8, 9, 0 and 1 in the window 15, that is, the new balance 8901, instead of 8, 7, 5 and 3, that is, 8753, which number represented the old balance.

VII. The new balance of the account X will be compared with the result arrived at in the books, after which the stirrup 14 is returned to its original position and the reverse movements take place to those described in paragraph II.

The movement of the stirrup 14 is transmitted by the levers and the gears 57, 48, 42, 10 and 40 to the frame 3 with the crossbars 9, so that this frame is raised and releases the racks 1, so that they are enabled to move upwards if necessary (but never by more than 9 teeth). It will be seen that the axes of rotation of the gears 12 and the stirrup 14 again coincide and that consequently the teeth 45 of the stirrup 14, on moving upwards into the position I, will strike against the teeth 44 of the gears 12, assuming that the gears 12 do not happen to be in a zero position and consequently the teeth 45 of the stirrup 14 will turn the various gears 12 into their zero positions. As the gears 12 are in engagement with the gears 11 and the latter are in operative connection with the long pinions 6 by the bevel gears 55 and 56, the racks 1 will at the same time be raised in correspondence with the rotation, which each corresponding gear 12 has experienced, on being moved by the teeth 45 of the stirrup 14 into its zero position.

Thus, in the example under discussion the stirrup 14 will turn back the units gear 12 by one tooth, the tens gear 12 will remain in its position, as it is already in the zero position, so that the tooth 45 of the stirrup 14 will not meet any opposition in the shape of the tooth 44 of the gear when describing its path of 81°, the hundreds gear will be turned back by nine teeth and the thousands gear by eight teeth.

Hence, the racks 1 will occupy the following positions:—

8, 9, 0, 1 thus giving the new balance.

It is obvious that the upward movement of the racks 1 must necessarily correspond to the rotary movement of the gears 12, so that it is quite out of the question that too great or too small a movement can take place as long as the machine has not been damaged in any way.

The movement of the stirrup 14, just described, brings the upper parts of the machine into the position shown in the seventh row of Fig. 7. This position is similar to that shown in the first row of Fig. 7, except that the positions of the racks 1 correspond to the new balance 8901 instead of to the old balance 8753.

Let it be assumed that the balance 8901 of the account X is to be reduced by 2305.

The separate positions, which the principal parts of the machine will occupy in this case, (1) on the sliding member 51 of account X being pressed in, (2) on the stirrup 14 being turned down into the position II, (3) on the crank 54 being turned over, are shown in the first, second and third rows of Fig. 8 and correspond exactly to those described in paragraphs I, II and III in connection with Fig. 7.

The fourth row shows in what position the parts will be, as soon as the balance has been reduced by the amount 2305. For carrying out this reduction of the balance, the procedure is the converse of that described in paragraph IV. The gears 12, which are seen through the slots 59 in the casing, will be turned through the corresponding number of teeth (either directly or with the interposition of some well known setting device), the movement being counter-clockwise, while it was clockwise in the case where the balance was to be increased. The gears 19 will indicate in the window 21 in red figures (when adding, in black figures) the amount, which has been deducted.

The units gear 12 will be turned back by five teeth and as it stood at 1, it will now indicate 6 in the previous quadrant. On the gear passing from 0 to 9 (from one quadrant to another) the arrangement for carrying over the tens will be operated, the movement being the opposite to that when adding, so that, on the gear 12 going back from the wheel 19 to the gear 11, the tens gear 12 will be turned back by one tooth.

No change has to be effected in the case of the tens gear 12.

The hundreds gear 12 must be turned back by three teeth and, as in the operation II, it was advanced by nine teeth, it will now be turned back to 6 in the same quadrant. Hence, as the rotary movements of this gear remain within the limits of one quadrant, the arrangement for carrying over the tens will not be operated.

Similarly, the thousands gear 12, which was at the numeral 8 and has to be turned back by two teeth, will be brought to a stop at 6 in the same quadrant and will also not move the arrangement for carrying over the tens.

After these operations have been effected there will appear in the window at 21 on the numeral discs of the gears 19 the numerals 2, 3, 0 and 5, that is, the amount 2305, which was to be deducted. It should be borne in mind that the gears 19 have twenty teeth and that on their numeral discs according to the position of the teeth from zero in both directions, the numerals 1 to 9 are given in black and once in red. Consequently the amount 2305 appears in red in the window 21, while in the window 15 no number is to be seen.

It will now be sufficient, exactly as in the case of addition, to turn the crank 54 back into its original position, in order that the subtraction may be completed by the gears 12 returning successively from the wheels 19 to the gears 11. The fifth row in Fig. 8 illustrates this operation. The units gear 12 will be the first to leave the slot 59 of the casing and to give the numeral 6 in the window 15. But, on the movement of this gear from the gear 19 to the gear 11 taking place, its arrangement for carrying over the tens, which, as will be remembered, was previously operated, will itself turn the tens gear 12 back by one tooth.

The tens gear 12 will then follow and, as it has just been turned back by one tooth, it will no longer show zero, but 9 in the window 15. On passing from zero to 9, that is, from one quadrant to the other, the arrangement belonging to this gear for carrying over the tens will have been operated in the opposite direction to that of the adding operation, so that the tens gear 12, during its return movement from the gear 19 to the gear 11, will turn back the hundreds gear 12 through one place by means of the arrangement for carrying over the tens.

The hundreds gear thereupon follows in the return movement from the gear 19 to the gear 11, but will show in the window 15, instead of the numeral 6, only the numeral 5.

Finally, the thousands gear 12 returns to the gear 11 and will show the numeral 6 without any change.

All the gears 12 will now be again in engagement with the gears 11 and will indicate the numerals 6, 5, 9 and 6, that is the new balance 6596. The sixth row of Fig. 8 shows the main parts of the machine disposed in this manner and the eighth row of Fig. 7 gives the position, which the parts of the machine will occupy, after the stirrup 14 has returned to its top position I. The movements and positions shown in the sixth and seventh rows are exactly the same as those in the case of addition, as described in paragraphs VI and VII.

The mechanism for calculating the interest numbers will only be operated once a day, either after all the entries have been made in the books, or on the following morning, before any debit or credit has been entered. For fixing the interest numbers for all the accounts without exception for any particular day, it is only necessary to turn the crank 69 until the plate 62 reaches its lowest position, during which movement it draws down the frame 61, so that the gears 60 engage with the racks 1.

As soon as the plate 62 has reached its lowest position, the gears 60 will be engaged with the racks 1, by shifting the frame 61 which may be effected manually after which the crank 69 is turned in the opposite direction until the plate 62 has again reached its highest position.

In the claims the words "geared totalizer dials" are used to refer to the geared dials 12 and the expression "geared adding dials" is used to refer to the geared dials 19.

Having now particularly described and ascertained the nature of my said invention and in what manner the same is to be performed, I declare that what I claim is:—

1. An account calculating machine comprising in combination sets of digit racks, each set representing an account, means for connecting at will an individual set of racks to the totalizing mechanism of the calculating machine, means for moving the set of racks to the zero position, said means being connected to an individual set of racks by the operation of the mechanism connecting the individual set to the totalizing mechanism of the calculating machine, a set of geared totalizer dials in the calculating machine adapted to be positively connected with any individual set of racks, and means for returning the geared totalizer dials to the zero position whereby the amount of the account set up in an individual set of racks can be transferred to the totalizer dials and conversely the amount set up on the totalizer dials can be transferred to an individual set of racks.

2. An account calculating machine comprising in combination a calculating mechanism containing a set of geared totalizer dials, sets of digit racks, each set representing an account, means for connecting an individual set of racks to an intermediate set of gears in the calculating machine, means for returning the racks to the zero position said means being connected to an individual set of racks by the operation of the mechanism connecting the set to the intermediate set of gears in the calculating machine, means for engaging the geared totalizer dials with the intermediate gears and means for returning the geared totalizer dials to their zero positions.

3. An account calculating machine comprising in combination a calculating mechanism, sets of digit racks arranged side by side the racks corresponding to the various digits being placed in parallel rows, a long pinion in front of each row of racks, means for meshing any individual set of racks with the pinions, means for moving the sets of racks to their zero position which means are connected to an individual set by the operation of the corresponding mechanism for meshing the set with the pinions, an intermediate set of gears in the calculator positively driven from the long pinions, geared totalizer dials, means for bringing the geared totalizer dials into mesh with the intermediate set of gears and means for returning the totalizer dials to their zero position without disconnecting the gears from the intermediate gears.

4. In an account calculating machine the combination of a calculator, sets of racks, each set corresponding to an account, means for positively connecting individual sets of racks with a set of geared totalizer dials in the calculator, means for returning the engaged set of racks to their zero position, a bail adapted to engage with teeth associated with the totalizer dials for the purpose of returning these dials to their zero positions, whereby the rotation of the totalizer dials is transmitted to the corresponding racks in the engaged set.

5. In an account calculating machine the combination of sets of digit racks, each set corresponding to an account, means for positively connecting an individual set of racks to a set of intermediate gears in the calculator, a set of geared totalizer dials in the calculator journalled in pivotally mounted arms and adapted to be moved into engagement with the set of intermediate gears and means for returning the totalizer dials to their zero position while in engagement with the intermediate gears and means for returning the sets of racks to their zero position while connected to the intermediate gears.

6. An account calculating machine comprising in combination sets of digit racks, each set representing an account, a calculating mechanism comprising an intermediate set of gears, a set of manually actuated geared adding dials, a set of geared totalizer dials, means for throwing the totalizing gears into engagement with the intermediate gears or adding gears at will, means for returning the totalizer gears to their zero positions, means for positively connecting a set of racks to the intermediate gears and means for returning the racks to zero position which means are connected to any set of racks by the operation of the mechanism connecting the set to the intermediate gears.

7. An account calculating machine, which comprises in combination sets of digit racks arranged side by side, each set representing an account, the racks corresponding to the respective digits forming parallel rows, a long pinion in front of each row of racks, means for returning the sets of racks to zero position, means for simultaneously meshing any set of racks with the long pinions and connecting with the mechanism for returning to zero position, positive connection between each long pinion and a corresponding intermediate gear in the calculator proper, a set of manually operated geared adding dials, a set of geared totalizer dials journalled in a pivotally mounted frame and adapted to be moved into engagement with the intermediate gears or the adding gears at will, a set of teeth associated with each geared totalizer dial and being smaller in numbers than the teeth of the dial gear, a bail adapted to engage the teeth associated with the totalizer dials and capable of sufficient movement about the axis of the totalizer dials to reset the dials to zero.

8. In an account calculating machine according to claim 1 independent sets of geared dials capable of being moved into engagement with the sets of racks and repeatedly actuated on the racks whereby multiples of the amounts set up on the racks may be set up on the dials.

In testimony whereof, I have signed my name to this specification.

FRANCISCO CAMPOS CAMPAÑA.